US011350335B2

(12) United States Patent
Lin

(10) Patent No.: US 11,350,335 B2
(45) Date of Patent: May 31, 2022

(54) BASE STATION SWITCHING METHOD AND DEVICE BASED ON MOTION STATUS OF MOBILE DEVICE

(71) Applicant: HUAWEI TECHNOLOGIES CO., LTD., Shenzhen (CN)

(72) Inventor: Yangbo Lin, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/812,782

(22) Filed: Mar. 9, 2020

(65) Prior Publication Data

US 2020/0213925 A1 Jul. 2, 2020

Related U.S. Application Data

(63) Continuation of application No. PCT/CN2018/117134, filed on Nov. 23, 2018.

(30) Foreign Application Priority Data

Nov. 24, 2017 (CN) .......................... 201711193582.X

(51) Int. Cl.
*H04W 4/00* (2018.01)
*H04W 36/32* (2009.01)
*H04W 36/08* (2009.01)

(52) U.S. Cl.
CPC .......... *H04W 36/32* (2013.01); *H04W 36/08* (2013.01)

(58) Field of Classification Search
CPC ...... H04W 36/32; H04W 36/08; H04W 36/00
(Continued)

(56) References Cited

U.S. PATENT DOCUMENTS 5,345,467 A * 9/1994 Lomp .................. H04W 36/30
370/331
6,052,598 A * 4/2000 Rudrapatna .......... H04W 4/029
455/456.1
(Continued)

FOREIGN PATENT DOCUMENTS

CN 102056250 A 5/2011
CN 103096408 A 5/2013
(Continued)

OTHER PUBLICATIONS

International search report dated Feb. 1, 2019 from corresponding application No. PCT/CN2018/117134.
(Continued)

*Primary Examiner* — Amancio Gonzalez
(74) *Attorney, Agent, or Firm* — Hauptman Ham, LLP

(57) ABSTRACT

A base station switching method includes obtaining a current location and a motion status of a mobile device; predicting, based on the current location and the motion status of the mobile device, duration from a current moment to a moment when a base station that serves the mobile device completes switching from a first base station to a second base station, where the first base station currently serves the mobile device, and the second base station serves the mobile device after the first base station; and after the mobile device maintains a first communication connection to the first base station and establishes a second communication connection to the second base station, initiating the switching from the first base station to the second base station when a specified threshold is reached after a predetermined period of time of the duration elapses.

20 Claims, 4 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 7,751,829 | B2* | 7/2010 | Masuoka | G01S 1/68 |
| | | | | 455/456.1 |
| 8,958,396 | B2* | 2/2015 | Ishihara | H04W 28/26 |
| | | | | 370/334 |
| 9,084,171 | B2* | 7/2015 | Klein | H04W 36/30 |
| 9,247,473 | B2* | 1/2016 | Zhao | H04W 36/32 |
| 9,282,507 | B2* | 3/2016 | Schlatter | H04W 36/32 |
| 9,526,046 | B2* | 12/2016 | Tanino | H04W 24/08 |
| 9,585,074 | B2* | 2/2017 | Ode | H04W 36/18 |
| 10,070,352 | B1* | 9/2018 | Damenti | H04M 15/41 |
| 10,149,223 | B2* | 12/2018 | Guo | H04W 72/048 |
| 10,757,629 | B2* | 8/2020 | Faus Gregori | H04W 36/0038 |
| 10,827,401 | B2* | 11/2020 | Li | H04W 8/08 |
| 2004/0058678 | A1* | 3/2004 | deTorbal | H04W 36/32 |
| | | | | 455/99 |
| 2008/0107082 | A1 | 5/2008 | Igarashi et al. | |
| 2011/0124341 | A1 | 5/2011 | Kubo et al. | |
| 2012/0322497 | A1* | 12/2012 | Navda | H04W 36/0085 |
| | | | | 455/525 |
| 2015/0141019 | A1 | 5/2015 | Bengtsson et al. | |
| 2017/0215119 | A1 | 7/2017 | Hong et al. | |
| 2019/0037468 | A1* | 1/2019 | Bongaarts | H04W 36/32 |
| 2020/0304199 | A1* | 9/2020 | Claassen | H04W 72/0486 |

FOREIGN PATENT DOCUMENTS

| | | |
|---|---|---|
| CN | 103874146 A | 6/2014 |
| CN | 105873137 A | 8/2016 |
| CN | 106998575 A | 8/2017 |
| CN | 107295466 A | 10/2017 |
| CN | 107371201 A | 11/2017 |
| EP | 1401229 A1 | 3/2004 |
| EP | 2207383 A1 | 7/2010 |
| JP | 2004228881 A | 8/2004 |
| JP | 2008118551 A | 5/2008 |
| JP | 2009071646 A | 4/2009 |
| JP | 2015512177 A | 4/2015 |
| JP | 2017130797 A | 7/2017 |
| WO | 2016122589 A1 | 8/2016 |
| WO | 2017001219 A1 | 1/2017 |

OTHER PUBLICATIONS

IntelCorporation:"Handover optimization in NR for Rel 15",3GPP TSG RAN WG2 Meeting #100, R2-1712651, Reno, United State, Nov. 30 Dec. 3, 2017, XP051371571, total 2 pages.

Extended European search report dated Jul. 22, 2020 from corresponding application No. EP 18881721.7.

Huawei et al., "0ms mobility interruption in NR", 3GPP TSG-RAN WG2 Meeting #96, R2-168564, Reno, Nevada, Nov. 14-18, 2016, total 6 pages.

Chinese Office Action issued in corresponding Chinese Application No. 201711193582.X, dated Nov. 27, 2020, pp. 1-7.

Chinese Search Report issued in corresponding Chinese Application No. 201711193582.X, dated Nov. 19, 2020, pp. 1-3.

Chinese Office Action issued in corresponding Chinese Application No. 201711193582.X, dated Jul. 12, 2021, pp. 1-9.

Japanese Office Action issued in corresponding Japanese Application No. 2020-509026, dated Mar. 23, 2021, pp. 1-6.

* cited by examiner

BASE STATION SWITCHING METHOD AND DEVICE BASED ON MOTION STATUS OF MOBILE DEVICE

CROSS-REFERENCE TO RELATED APPLICATIONS

This application is a continuation of International Application No. PCT/CN2018/117134, filed on Nov. 23, 2018, which claims priority to Chinese Patent Application No. 201711193582.X, filed on Nov. 24, 2017. The disclosures of the aforementioned applications are hereby incorporated by reference in their entireties.

TECHNICAL FIELD

The present application relates to the wireless communications field, and in particular, to a base station switching method and device based on a motion status of a mobile device.

BACKGROUND

An intelligent transportation system (ITS) is intended to establish, by integrating and using advanced information technologies, communications technologies, sensing technologies, control technologies, computer technologies, and the like, a real-time, accurate, and highly-efficient comprehensive transportation management system that plays an all-round role in a wide range.

The ITS may effectively use traffic facilities, reduce traffic load and environmental pollution, ensure traffic safety, and improve transportation efficiency. The ITS indicates a future development direction of a transportation system, and is an important part of an intelligent city. Main participants in the ITS are road infrastructures, vehicles, management centers, users, and the like.

As main vehicles, the vehicles in the ITS need to communicate with other vehicles, road infrastructures, traffic management centers, users, and the like, which is also referred to as a vehicle to everything (V2X).

When the V2X is implemented based on a wireless communications network, such as LTE and 5G; a vehicle is used as a mobile device to travel between serving cells of base stations. Therefore, the base station needs to be switched to ensure continuity of a service provided for the vehicle.

Currently, it is determined that a base station is switched based on signal strength of a base station received by a mobile device, for example, a mobile phone. When signal strength of a base station that currently serves the mobile device received by the mobile device is less than signal strength of another base station, the another base station is used as a next base station that serves the mobile device. Then the mobile device establishes a communication connection to the next base station that serves the mobile device, and finally, the service provided by the base station for the mobile device is handed over from the base station that currently serves the mobile device to the next base station that serves the mobile device.

However, compared with a conventional mobile device, for example, a mobile phone, a vehicle is a new mobile device, and is characterized by a higher moving speed, a lower requirement on a transmission delay, and a higher requirement on service continuity. In this case, timeliness and reliability of base station switching cannot be determined based on signal strength of a base station only, and there may even be a case in which the vehicle has crossed a serving cell and the base station switching is not completed.

SUMMARY

The embodiments discussed in this application provide a base station switching method and device based on a motion status of a mobile device, which can start base station switching at a more proper time, and quickly and seamlessly complete the base station switching, so as to meet requirements of security assurance and efficiency improvement.

According to a first aspect, a base station switching method based on a motion status of a mobile device is provided, and the method includes:

obtaining a current location and a motion status of a mobile device;

predicting, based on the current location and the motion status of the mobile device, a duration from a current moment to a moment when a base station that serves the mobile device completes a switching from a first base station to a second base station, where the first base station currently serves the mobile device, and the second base station serves the mobile device after the first base station; and after the mobile device maintains a first communication connection to the first base station and establishes a second communication connection to the second base station, initiating the switching from the first base station to the second base station when a specified threshold is reached after a predetermined period of time of the duration elapses.

In some embodiments, the threshold is set based on an assumption that the mobile device has established the second communication connection to the second base station, and a required time from initiating the switching from the first base station to the second base station to completing the switching from the first base station to the second base station.

In some embodiments, the predicting, based on the current location and the motion status of the mobile device, the duration from the current moment to the moment when the base station that serves the mobile device completes switching from the first base station to the second base station includes:

obtaining a switching boundary between the first base station and the second base station; and determining the duration based on a time required for the mobile device to reach the switching boundary from the current location based on the motion status.

In some embodiments, the switching boundary is determined based on an intensity interface between a signal strength of the first base station and a signal strength of the second base station; or the switching boundary is determined based on a section of an intersection point between a surface of signal coverage space of the first base station and a surface of signal coverage space of the second base station.

In some embodiments, the mobile device establishes the second communication connection to the second base station includes:

establishing the second communication connection when the mobile device enters signal coverage space of the second base station.

In some embodiments, the signal coverage space of the base station is determined based on a location and the signal strength of the base station.

In some embodiments, initiating the switching from the first base station to the second base station includes:

indicating, to one or more of the first base station, the second base station, or the mobile device, that the base station that serves the mobile device is switched from the first base station to the second base station.

In some embodiments, completion of the switching from the first base station to the second base station includes:

serving the mobile device by the first base station through the first communication connection is switched to serving the mobile device by the second base station through the second communication connection.

In some embodiments, switching the first base station to the second base station includes:

the first base station handing over a service provided for the mobile device to the second base station.

In some embodiments, the second base station is determined based on the current location and a current direction of the mobile device; or the second base station is determined based on the first base station that currently serves the mobile device and a current direction of the mobile device.

In some embodiments, the first base station that currently serves the mobile device is determined based on the current location of the mobile device.

In some embodiments, the motion status includes one or more of a direction, a speed, an acceleration, and an angular velocity.

According to a second aspect, a base station switching device based on a motion status of a mobile device is provided, and the device includes:

an obtaining module, configured to obtain a current location and a motion status of a mobile device;

a prediction module, configured to predict, based on the current location and the motion status of the mobile device, a duration from a current moment to a moment when a base station that serves the mobile device completes a switching from a first base station to a second base station, where the first base station currently serves the mobile device, and the second base station serves the mobile device after the first base station; and a switching module, configured to: after the mobile device maintains a first communication connection to the first base station and establishes a second communication connection to the second base station, initiate the switching from the first base station to the second base station when a specified threshold is reached after a predetermined period of time of the duration elapses.

In some embodiments, the device further includes:

a setting module, configured to set the threshold based on an assumption that the mobile device has established the second communication connection to the second base station, and a required time from initiating the switching from the first base station to the second base station to completing the switching from the first base station to the second base station.

In some embodiments, the predicting by the prediction module, based on the current location and the motion status of the mobile device, the duration from the current moment to the moment when the base station that serves the mobile device completes switching from the first base station to the second base station includes:

the obtaining module obtaining a switching boundary between the first base station and the second base station; and the prediction module determining the duration based on a time required for the mobile device to reach the switching boundary from the current location based on the motion status.

In some embodiments, the switching boundary is determined based on an intensity interface between a signal strength of the first base station and a signal strength of the second base station; or the switching boundary is determined based on a section of an intersection point between a surface of signal coverage space of the first base station and a surface of signal coverage space of the second base station.

In some embodiments, the mobile device establishes the second communication connection to the second base station includes:

establishing the second communication connection when the mobile device enters signal coverage space of the second base station.

In some embodiments, the signal coverage space of the base station is determined based on a location and the signal strength of the base station.

In some embodiments, initiating the switching from the first base station to the second base station includes:

the switching module indicates, to one or more of the first base station, the second base station, or the mobile device, that the base station that serves the mobile device is switched from the first base station to the second base station.

In some embodiments, completion of the switching from the first base station to the second base station includes:

serving the mobile device by the first base station through the first communication connection is switched to serving the mobile device by the second base station through the second communication connection.

In some embodiments, switching the first base station to the second base station includes:

the first base station handing over a service provided for the mobile device to the second base station.

In some embodiments, the second base station is determined based on the current location and a current direction of the mobile device; or the second base station t is determined based on the first base station that currently serves the mobile device and a current direction of the mobile device.

In some embodiments, the first base station that currently serves the mobile device is determined based on the current location of the mobile device.

In some embodiments, the motion status includes one or more of a direction, a speed, an acceleration, and an angular velocity.

DESCRIPTION OF EMBODIMENTS

The following describes the technical solutions in terms of example embodiments with reference to the accompanying drawings. Apparently, the described embodiments are some rather than all of the embodiments. All other embodiments obtained by a person of ordinary skill in the art based on the discussed embodiments without creative efforts shall fall within the protection scope of the present specification.

It should be understood that the embodiments may be applied to any mobile device in a wireless communications network. A vehicle is only one of typical mobile devices that are characterized by a higher moving speed, a lower requirement on a transmission delay, and a higher requirement on service continuity. For ease of description, the embodiments are described by using a vehicle as an example. However, this shall not constitute a limitation on an applicable mobile device.

In an ITS, precise positioning is a precondition for performing location-based traffic control and resource scheduling. Therefore, the vehicle to determines a location of the vehicle, and update the location based on a traveling direction, a speed, an acceleration, and an angular velocity of the vehicle. This may be implemented based on technologies such as a global positioning system and an electronic map.

In the wireless communications network, a location and signal strength of a base station affect signal coverage space of the base station. Therefore, a dynamic location of a traveling vehicle relative to each base station may be used to determine a base station that currently serves the vehicle and predict a base station that may serve the vehicle in the future.

In a specific area, a distribution diagram of signal coverage space of base stations is constructed based on locations and signal strength of the base stations. A location determines a center of signal coverage space of a base station, and signal strength determines a size of the signal coverage space of the base station. In addition, environmental factors such as astronomical factors and geographical factors may also affect the size and a shape of the signal coverage space of the base station.

If signal coverage space of one base station and signal coverage space of another base station partially overlap, a location for performing switching between the two base stations in an overlapping area may be determined by using the following two methods.

Figure 1:
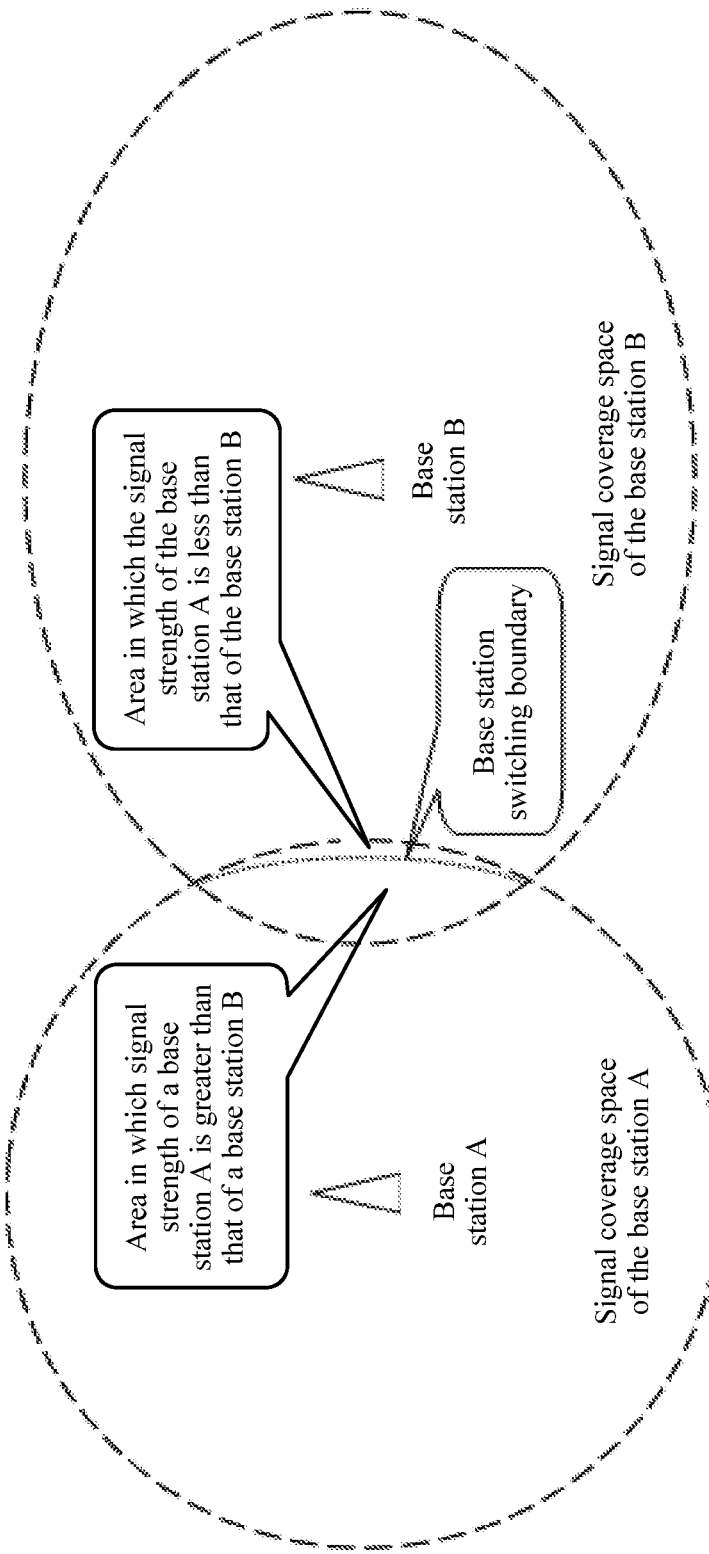
FIG. 1 is a schematic diagram of a method 1 for determining a switching boundary of base stations in an overlapping area, in accordance with one or more embodiments.

FIG. 1 is a schematic diagram of a method 1 for determining a switching boundary of base stations in an overlapping area, in accordance with one or more embodiments.

As shown in FIG. 1, signal coverage space of a base station A and signal coverage space of a base station B partially overlap.

In an overlapping area, signal strength of the base station A is compared with signal strength of the base station B at all locations to form an intensity interface. On the interface, the signal strength of the base station A is equal to the signal strength of the base station B; on one side of the interface, the signal strength of the base station A is greater than the signal strength of the base station B; and on the other side of the interface, the signal strength of the base station A is less than the signal strength of the base station B.

The interface is used as a boundary at which a base station that serves a vehicle is switched between the base station A and the base station B when the vehicle is traveling. When the vehicle enters the side on which the signal strength of the base station A is greater than the signal strength of the base station B, the base station is switched from the base station B to the base station A. When the vehicle enters the side on which the signal strength of the base station A is less than the signal strength of the base station B, the base station is switched from the base station A to the base station B.

Figure 2:
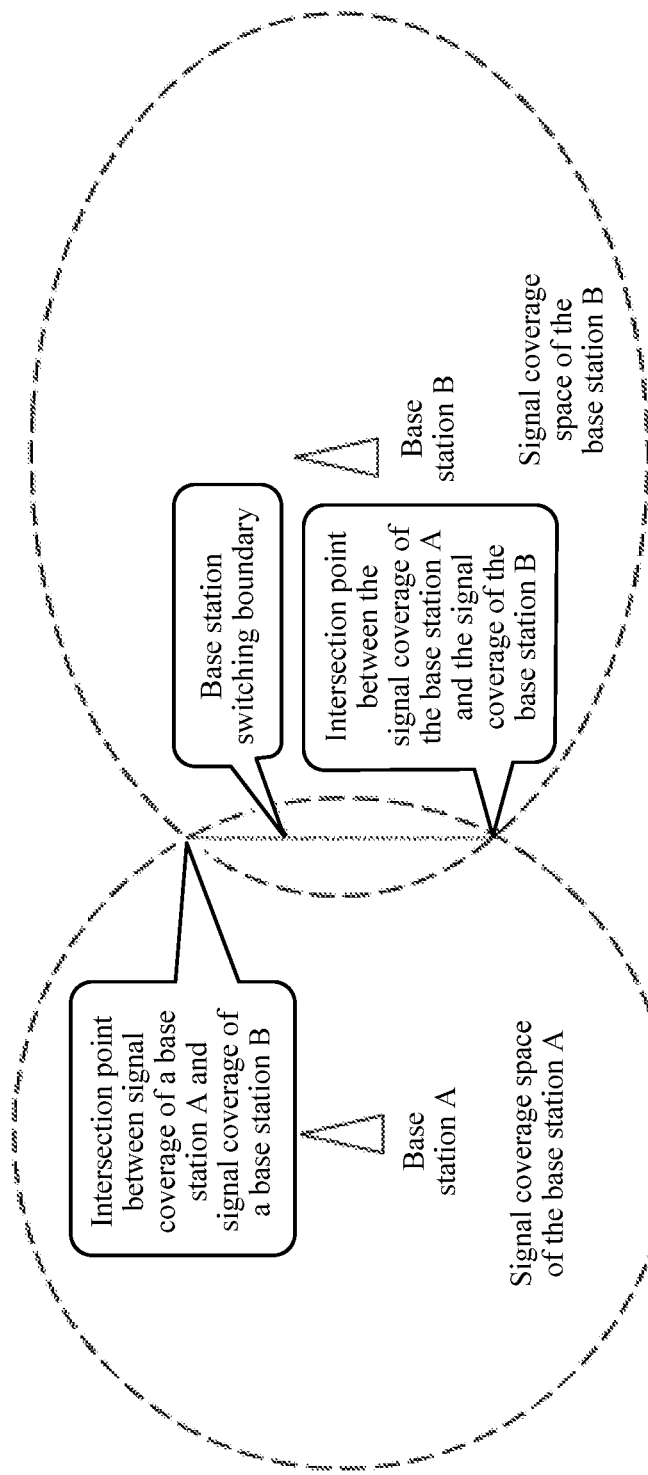
FIG. 2 is a schematic diagram of a method 2 for determining a switching boundary of base stations in an overlapping area, in accordance with one or more embodiments.

FIG. 2 is a schematic diagram of a method 2 for determining a switching boundary of base stations in an overlapping area, in accordance with one or more embodiments.

As shown in FIG. 2, signal coverage space of a base station A and signal coverage space of a base station B partially overlap.

In an overlapping area, a section is taken at an intersection point between a surface of signal coverage space of the base station A and a surface of signal coverage space of the base station B. The base station A is preferably used on a side that is of the section and that faces the base station A, and the base station B is preferably used on a side that is of the section and that faces the base station B.

The section is used as a boundary at which a base station that serves a vehicle is switched between the base station A and the base station B when the vehicle is traveling. When the vehicle enters the side that is of the section and that faces the base station A, the base station is switched from the base station B to the base station A. When the vehicle enters the side that is of the section and that faces the base station B, the base station is switched from the base station A to the base station B.

Figure 3:
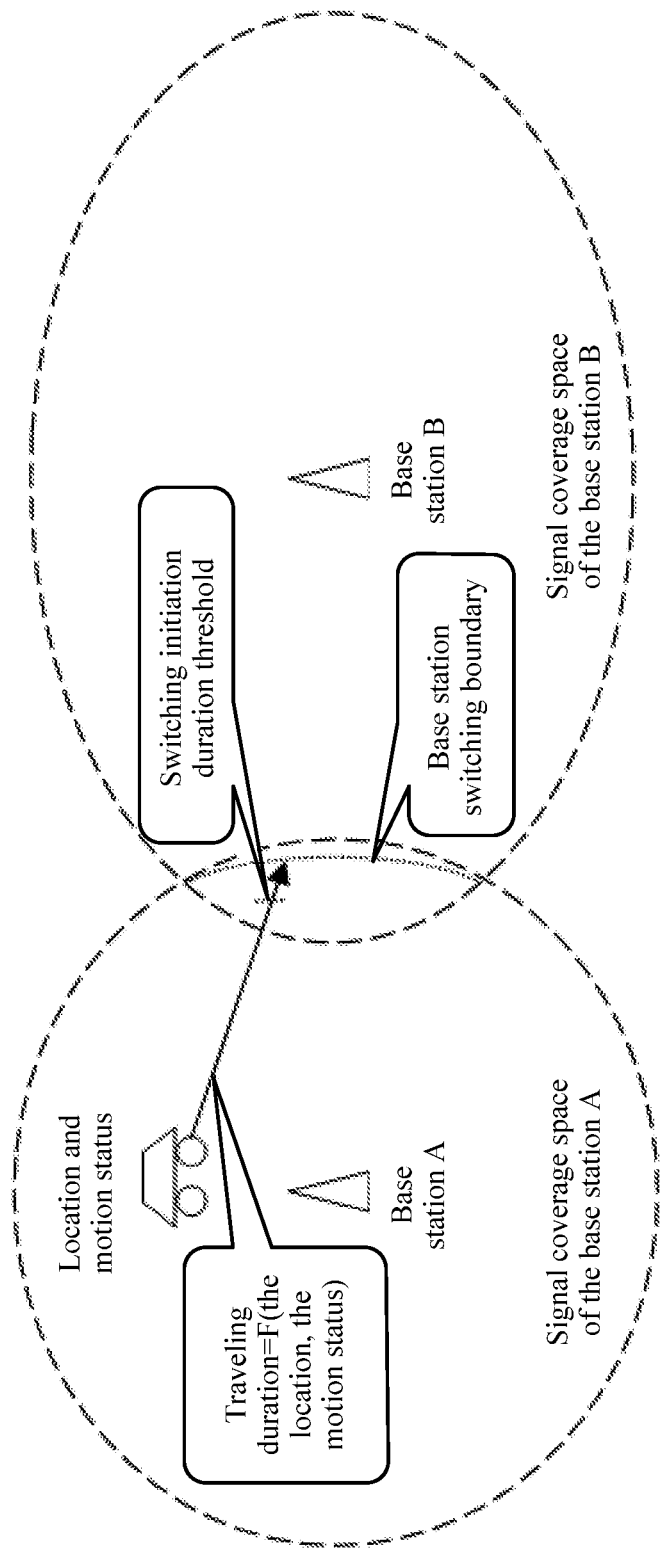
FIG. 3 is a schematic diagram of a base station switching method based on a motion status of a mobile device, in accordance with one or more embodiments.

FIG. 3 is a schematic diagram of a base station switching method based on a motion status of a mobile device, in accordance with one or more embodiments.

As shown in FIG. 3, a base station that serves a vehicle is switched when the vehicle is traveling.

A base station that currently serves the vehicle may be determined based on distribution of signal coverage space of base stations and a current location of the vehicle, and it is assumed that the base station is a base station A. The vehicle has established a communication connection a to the base station A, and the base station A is serving the vehicle through the communication connection a.

A next base station that serves the vehicle may be determined based on the distribution of the signal coverage space of the base stations and the current location and a current direction of the vehicle, or the base station A that currently serves the vehicle and the current direction of the vehicle, and it is assumed that the next base station is a base station B. The vehicle needs to establish a communication connection b to the base station B, and the base station B is to serve the vehicle through the communication connection b.

When the vehicle is in signal coverage space of the base station A, the base station A still serves the vehicle. For example, while the vehicle maintains the communication connection a to the base station A, the vehicle pre-establishes the communication connection b to the base station B when the vehicle travels into signal coverage space of the base station B.

A duration from a current moment to a moment when the base station that serves the vehicle completes switching from the base station A to the base station B may be determined based on a switching boundary between the base station A and the base station B in an overlapping area, the current location and a motion status of the vehicle, and a time required for the vehicle to travel from the current location to the switching boundary based on the motion status. The motion status of the vehicle may include a traveling direction, a speed, an acceleration, an angular velocity, and the like of the vehicle.

The duration dynamically changes with traveling of the vehicle. If a specified threshold arrives after a particular period of time of the duration elapses, base station switching is initiated. The switching of the base station that serves the vehicle from the base station A to the base station B is indicated to the base station A, the base station B, and/or the vehicle. Because a communication connection between the vehicle and the base station B has been pre-established, the threshold may be set based on a required time from initiating to completion of the base station switching. In this period, a service provided for the vehicle is mainly handed over from the base station A to the base station B. The time may be obtained through calculation, measurement, or statistics collection.

Because motion statuses are different for all vehicles, an initiation moment of the base station switching determined by using the foregoing method may correspond to different locations for the vehicles.

After the base station switching is completed, after serving the vehicle by the base station A through the communication connection a is switched to serving the vehicle by the base station B through the communication connection b, the communication connection a between the vehicle and the base station A may be broken, or may be broken only when the vehicle travels out of the signal coverage space of the base station A.

Figure 4:
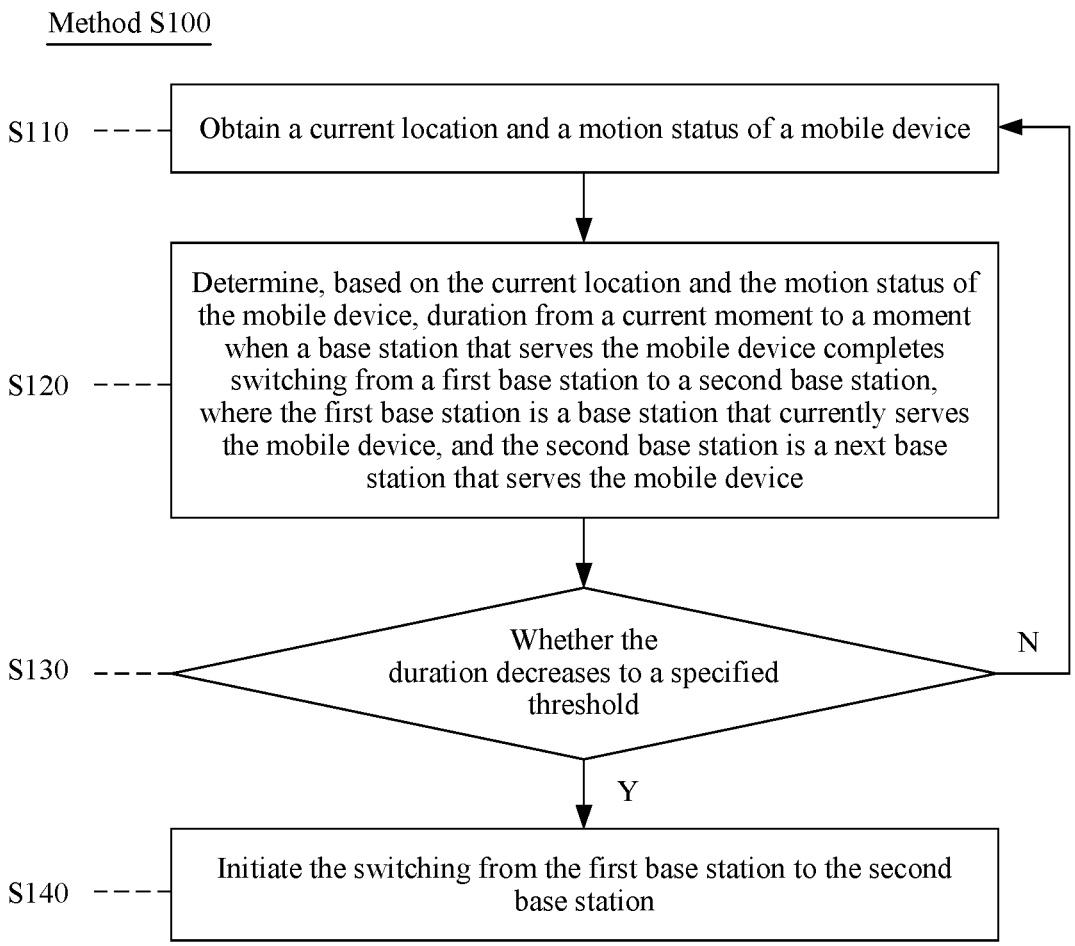
FIG. 4 is a flowchart of a base station switching method based on a motion status of a mobile device, in accordance with one or more embodiments.

FIG. 4 is a schematic flowchart of a base station switching method based on a motion status of a mobile device, in accordance with one or more embodiments. In some embodiments, the method may be performed by a base station, or may be performed by a mobile device. In an intelligent driving field, the method may be performed by a mobile service switching center. As shown in FIG. 4, the method S100 includes the following steps:

S110. Obtain a current location and a motion status of a mobile device.

S120. Determine, based on the current location and the motion status of the mobile device, duration from a current moment to a moment when a base station that serves the mobile device completes switching from a first base station to a second base station, where the first base station is a base station that currently serves the mobile device, and the second base station is a next base station that serves the mobile device.

S130. After the mobile device maintains a first communication connection to the first base station and establishes a second communication connection to the second base station, determine whether a specified threshold arrives after a particular period of time of the duration elapses. If yes, perform S140; otherwise, go back to S110.

S140. Initiate the switching from the first base station to the second base station.

Figure 5:
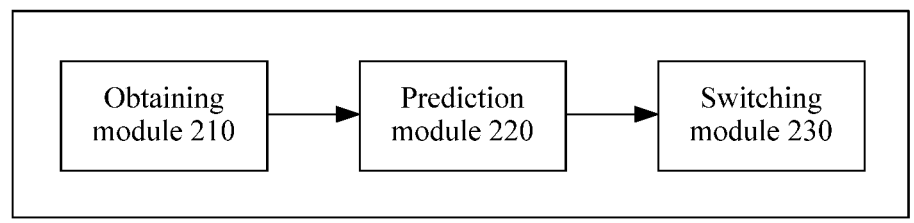
FIG. 5 is a schematic diagram of modules of a base station switching device based on a motion status of a mobile device, in accordance with one or more embodiments.

FIG. 5 is a schematic diagram of modules of a base station switching device based on a motion status of a mobile device.

As shown in FIG. 5, the apparatus 200 includes an obtaining module 210, a prediction module 220, and a switching module 230.

The obtaining module 210 is configured to obtain a current location and a motion status of a mobile device. In all possible embodiments, the motion status may include any combination of a direction, a speed, an acceleration, and an angular velocity.

The prediction module 220 is configured to predict, based on the current location and the motion status of the mobile device, duration from a current moment to a moment when a base station that serves the mobile device completes switching from a first base station to a second base station, where the first base station is a base station that currently serves the mobile device, and the second base station is a next base station that serves the mobile device.

The prediction module may determine, based on the current location and a current direction of the mobile device, the next base station that serves the mobile device. Alternatively, in another manner, the prediction module 220 may determine, based on the base station that currently serves the mobile device and a current direction of the mobile device, the next base station that serves the mobile device.

The switching module 230 is configured to: after the mobile device maintains a first communication connection to the first base station and establishes a second communication connection to the second base station, initiate the switching from the first base station to the second base station when a specified threshold arrives after a particular period of time of the duration elapses.

In an implementation, the switching module in the apparatus 200 is further configured to set the threshold based on an assumption that the mobile device has established the second communication connection to the second base station, and a required time from the initiating the switching from the first base station to the second base station to the completing the switching from the first base station to the second base station.

In some embodiments, the prediction module determines a switching boundary between the first base station and the second base station, and determines the duration based on the time required for the mobile device to reach the switching boundary from the location based on the motion status. In a manner, the prediction module determines the switching boundary based on an intensity interface between signal strength of the first base station and signal strength of the second base station. Alternatively, in another manner, the prediction module determines the switching boundary based on a section of an intersection point between a surface of signal coverage space of the first base station and a surface of signal coverage space of the second base station.

In some embodiments, after the mobile device maintains the first communication connection to the first base station and establishes the second communication connection to the second base station, and when the specified threshold arrives after a particular period of time of the duration elapses, the switching module indicates, to the first base station, the second base station, or the mobile device, that the base station that serves the mobile device is switched from the first base station to the second base station.

The foregoing solutions may be implemented by a vehicle, a base station, a mobile service switching center, or another functional entity. The foregoing apparatus 200 may be a processor with some modules having calculation and processing capabilities. The implementers should understand distribution of signal coverage space of base stations, including a switching boundary between the base stations having overlapping coverage space, and a current location and a motion status of a vehicle.

It should be understood that the apparatus 200 according to this embodiment may correspond to an execution body of the method 100 in some embodiments, and the foregoing and other operations and/or functions of the modules in the apparatus 200 are respectively intended to implement corresponding procedures of the method 100. For brevity, details are not described herein again.

It should be understood that in one or more embodiments, "B corresponding to A" indicates that B is associated with A, and B may be determined based on A. However, it should be further understood that determining B based on A does not mean that B is determined based on A only, in other words, B may also be determined based on A and/or other information.

It should be further understood that, unless the context clearly supports an exception, a single form "one" ("a", "an", and "the") used in this specification also intends to include a plural form. It should be further understood that, "and/or" used in this specification includes any or all possible combinations of one or more associated listed items.

A person of ordinary skill in the art may be aware that, in combination with the embodiments disclosed in this specification, units and algorithm steps in the examples may be implemented by electronic hardware, computer software, or a combination thereof. To clearly describe the interchangeability between hardware and software, the foregoing has generally described compositions and steps of each example based on functions. Whether the functions are performed by the hardware or the software depends on particular applications and design constraints of the technical solutions. A person skilled in the art may use different methods to implement the described functions for each particular application, but it should not be considered that the implementation goes beyond the scope of the present description.

It may be clearly understood by a person skilled in the art that, for convenient and brief description, for specific operating processes of the foregoing system, apparatus, and unit, refer to corresponding processes in the foregoing method embodiments. Details are not described herein again.

In some embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated in another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the discussed embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When being implemented in the form of the software functional unit and sold or used as an independent product, the integrated unit may be stored in a computer-readable storage medium. Based on such an understanding, the discussed technical solutions, or the part contributing to the prior art, or all or some of the technical solutions may be implemented in a form of a software product. The computer software product is stored in a storage medium and includes several instructions for instructing a computer device (which may be a personal computer, a server, or a network device) to perform all or some of the steps of the methods described in the embodiments. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific example embodiments, but are not intended to limit the protection scope of the present disclosure. Any equivalent modification or replacement readily figured out by a person skilled in the art within the technical scope disclosed in the present specification shall fall within the protection scope of the present application. This application is intended to cover these modifications and variations provided that they fall within the scope of protection defined by the following claims and their equivalent technologies.

What is claimed is:

1. A base station switching method based on a motion status of a mobile device, the method comprising:
   obtaining a current location and a motion status of a mobile device;
   predicting, based on the current location and the motion status of the mobile device, a duration from a current moment to a moment when a base station that serves the mobile device completes a switching from a first base station to a second base station, wherein the first base station currently serves the mobile device, and the second base station serves the mobile device after the first base station; and
   after the mobile device maintains a first communication connection to the first base station and establishes a second communication connection to the second base station, initiating the switching from the first base station to the second base station when a specified threshold is reached after a predetermined period of time of the duration elapses.

2. The method according to claim 1, further comprising:
   setting the threshold based on an assumption that the mobile device has established the second communication connection to the second base station, and a required time from initiating the switching from the first base station to the second base station to completing the switching from the first base station to the second base station.

3. The method according to claim 1, wherein the predicting, based on the current location and the motion status of the mobile device, the duration from the current moment to the moment when the base station that serves the mobile device completes switching from the first base station to the second base station comprises:
   obtaining a switching boundary between the first base station and the second base station; and
   determining the duration based on a time required for the mobile device to reach the switching boundary from the current location based on the motion status.

4. The method according to claim 3, further comprising:
   determining the switching boundary based on an intensity interface between a signal strength of the first base station and a signal strength of the second base station.

5. The method according to claim 3, further comprising:
   determining the switching boundary based on a section of an intersection point between a surface of signal coverage space of the first base station and a surface of signal coverage space of the second base station.

6. The method according to claim 1, wherein the mobile device establishes the second communication connection to the second base station comprises:
   establishing the second communication connection when the mobile device enters signal coverage space of the second base station.

7. The method according to claim 1, wherein initiating the switching from the first base station to the second base station comprises:
indicating, to one or more of the first base station, the second base station, or the mobile device, that the base station that serves the mobile device is switched from the first base station to the second base station.

8. The method according to claim 1, further comprising:
determining the second base station based on the current location and a current direction of the mobile device.

9. The method according to claim 1, further comprising:
determining the second base station based on the first base station that currently serves the mobile device and a current direction of the mobile device.

10. The method according to claim 1, wherein the motion status comprises one or more of a direction, a speed, an acceleration, or an angular velocity.

11. A base station switching apparatus, comprising:
at least one processor; and
a non-transitory computer-readable storage medium coupled to the at least one processor and storing programming instructions for execution by the at least one processor, the programming instructions instruct the at least one processor to perform the following operations:
obtaining a current location and a motion status of a mobile device;
predicting, based on the current location and the motion status of the mobile device, a duration from a current moment to a moment when a base station that serves the mobile device completes switching from a first base station to a second base station, wherein the first base station currently serves the mobile device, and the second base station serves the mobile device after the first base station; and
after the mobile device maintains a first communication connection to the first base station and establishes a second communication connection to the second base station, initiating the switching from the first base station to the second base station when a specified threshold is reached after a predetermined period of time of the duration elapses.

12. The apparatus according to claim 11, wherein the programming instructions further instruct the at least one processor to perform the following operation steps:
setting the threshold based on an assumption that the mobile device has established the second communication connection to the second base station, and a required time from initiating the switching from the first base station to the second base station to completing the switching from the first base station to the second base station.

13. The apparatus according to claim 11, wherein the programming instructions further instruct the at least one processor to perform the following operation steps:
determining a switching boundary between the first base station and the second base station; and
determining the duration based on a time required for the mobile device to reach the switching boundary from the current location based on the motion status.

14. The apparatus according to claim 13, wherein the programming instructions further instruct the at least one processor to perform the following operation steps:
determining the switching boundary based on an intensity interface between a signal strength of the first base station and a signal strength of the second base station.

15. The apparatus according to claim 13, wherein the programming instructions further instruct the at least one processor to perform the following operation steps:
determining the switching boundary based on a section of an intersection point between a surface of signal coverage space of the first base station and a surface of signal coverage space of the second base station.

16. The apparatus according to claim 11, wherein the programming instructions further instruct the at least one processor to perform the following operation steps:
after the mobile device maintains the first communication connection to the first base station and establishes the second communication connection to the second base station, when the specified threshold is reached after the predetermined period of time of the duration elapses, indicating, to one or more of the first base station, the second base station, or the mobile device, that the base station that serves the mobile device is switched from the first base station to the second base station.

17. The apparatus according to claim 11, wherein the programming instructions further instruct the at least one processor to perform the following operation steps:
determining the second base station based on the current location and a current direction of the mobile device.

18. The apparatus according to claim 11, wherein the programming instructions further instruct the at least one processor to perform the following operation steps:
determining the second base station based on the firstbase station that currently serves the mobile device and a current direction of the mobile device.

19. The apparatus according to claim 11, wherein the motion status comprises one or more of a direction, a speed, an acceleration, or an angular velocity.

20. A non-transitory computer readable storage medium, wherein the computer readable storage medium includes instructions that, when at least one processor of a computing device executes the instructions, the computing device performs the following operations:
obtaining a current location and a motion status of a mobile device;
predicting, based on the current location and the motion status of the mobile device, a duration from a current moment to a moment when a base station that serves the mobile device completes switching from a first base station to a second base station, wherein the first base station currently serves the mobile device, and the second base station serves the mobile device after the first base station; and
after the mobile device maintains a first communication connection to the first base station and establishes a second communication connection to the second base station, initiating the switching from the first base station to the second base station when a specified threshold is reached after a predetermined period of time of the duration elapses.

* * * * *